United States Patent
Van Erven

(10) Patent No.: US 6,961,596 B2
(45) Date of Patent: Nov. 1, 2005

(54) MODULAR RF ANTENNA AND FILTER SYSTEM FOR DUAL RADIO WLAN ACCESS POINTS

(75) Inventor: Niels Van Erven, Sunnyvale, CA (US)

(73) Assignee: 3COM Corporation, Marlborough, MA (US)

( * ) Notice: Subject to any disclaimer, the term of this patent is extended or adjusted under 35 U.S.C. 154(b) by 119 days.

(21) Appl. No.: 10/419,638

(22) Filed: Apr. 21, 2003

(65) Prior Publication Data

US 2004/0209611 A1 Oct. 21, 2004

(51) Int. Cl.⁷ ............................... H04B 1/38; H04B 1/08
(52) U.S. Cl. .................... 455/575; 455/132; 455/575.7; 455/269; 455/348
(58) Field of Search ................ 455/41.2, 132, 455/269, 272, 275, 339, 348, 575.6, 575.7, 575.1, 98, 82, 83, 101, 193.1, 278.1, 129, 562.1; 343/702, 718

(56) References Cited

U.S. PATENT DOCUMENTS

| | | | | |
|---|---|---|---|---|
| 4,010,474 A | * | 3/1977 | Provencher | 343/814 |
| 4,723,294 A | * | 2/1988 | Taguchi | 381/94.7 |
| 5,581,268 A | * | 12/1996 | Hirshfield | 343/853 |
| 5,628,049 A | * | 5/1997 | Suemitsu | 455/11.1 |
| 6,100,847 A | * | 8/2000 | Sointula | 343/702 |
| 6,298,243 B1 | | 10/2001 | Basile | |
| 6,564,044 B1 | * | 5/2003 | Rilling | 455/277.1 |
| 6,759,924 B2 | * | 7/2004 | Sakuragawa et al. | 333/133 |
| 2002/0037742 A1 | | 3/2002 | Enderlein et al. | |
| 2002/0183013 A1 | * | 12/2002 | Auckland et al. | 455/73 |

FOREIGN PATENT DOCUMENTS

| | | |
|---|---|---|
| EP | 1 261 142 A1 | 11/2002 |
| EP | 1 294 048 A2 | 3/2003 |
| WO | WO 99/08395 | 2/1999 |

OTHER PUBLICATIONS

Press Release entitled "Linksys Dual–Band Wireless A+G Is Touted for Its Excellent Speed and Range" May 20, 2003, consisting of 1 page. (May Not Be Prior Art).

* cited by examiner

*Primary Examiner*—Simon Nguyen
(74) *Attorney, Agent, or Firm*—Ernest J. Beffel, Jr.; Haynes, Beffel & Wolfeld LLP

(57) ABSTRACT

The present invention relates to low-cost improvement of performance of multiple radio wireless access points. It relates to combinations of an antenna and one or more of a filter or an active components such as a power amplifier, low noise amplifier, switching diode or RF phase shifter (with a plurality of antennas), connected to the antenna connector of a radio component. Particular aspects of the present invention are described in the claims, specification and drawings.

17 Claims, 3 Drawing Sheets

MODULAR RF ANTENNA AND FILTER SYSTEM FOR DUAL RADIO WLAN ACCESS POINTS

BACKGROUND OF THE INVENTION

The present invention relates to low-cost improvement of performance of multiple radio wireless access points. It relates to combinations of an antenna and one or more of a filter or an active components such as a power amplifier, low noise amplifier, switching diode or RF phase shifter (with a plurality of antennas), connected to the antenna connector of a radio component.

Multiple radio wireless LAN (WLAN) access points are emerging product category. For instance, Linksys has announced that it will soon ship a universal wireless access point (WAP55AG) that includes two radios and supports three standards for wireless communications: 802.11a, 802.11b. and 802.11g. Support for multiple wireless communications standards is becoming increasingly important in the unlicensed radio spectrum. For instance, Bluetooth and 802.11 standards operate in the unlicensed spectrum at approximately 2.4 and 5.25 gigahertz. Support for multiple communications standards is important as wireless communication speeds increase from 2 to 11 to 54 Mbps. The evolution of standards has led to such suggestions as programmable filter systems in which components are reconfigurable for a variety of air interface standards. See, U.S. Patent App. No. US 2002/0183013 A1, "Programmable Radio Frequency Sub-System with Integrated Antennas and Filters and Wireless Communication Device Using Same", published 5 Dec. 2002. Inevitably, such grand designs with integration of radio components and antenna components are relatively expensive to implement and better suited to portable devices than to access points or base stations.

One issue with use of multiple radios in a compact access point is the effect of noise from one radio on reception by another radio. See, European Patent App. No. EP 1 294 048 A2, entitled "information Device Incorporating an Integrated Antenna for Wireless Communication", published 19 Mar. 2003, at columns 1–2. Low-cost power amplifiers create a certain noise level across a broad spectrum. This is illustrated in FIG. 1, by signal curve 101 and noise curve 102. Two typical approaches are to improve the radio by adding on-board components or to increase the separation distance between antennas. The first approach increases the expense of the access point. The other approach increases the size.

At a practical, manufacturing level, access point technology involves contract manufacturing of commodities. Radios used by different manufacturers of access points are or may become standardized, interchangeable commodities. A manufactured access point, illustrated by FIG. 2, may include a motherboard 201, plug-in radio modules 202–203 and antennas 204–205. The motherboards and radio modules may be built to specification, according to designs of commodity manufacturers and not to designs of the manufacturers who brand the access points. In the future, the radios may be integrated on the motherboard by the commodity manufacturers.

Given the anticipated popularity of multiple radio wireless access points, an opportunity arises for methods and devices that improve performance at a modest cost, while taking advantage of commodity components.

SUMMARY OF THE INVENTION

The present invention relates to low-cost improvement of performance of multiple radio wireless access points. It relates to combinations of an antenna and one or more of a filter or an active components such as a power amplifier, low noise amplifier, switching diode or RF phase shifter (with a plurality of antennas), connected to the antenna connector of a radio component. Particular aspects of the present invention are described in the claims, specification and drawings.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 1:
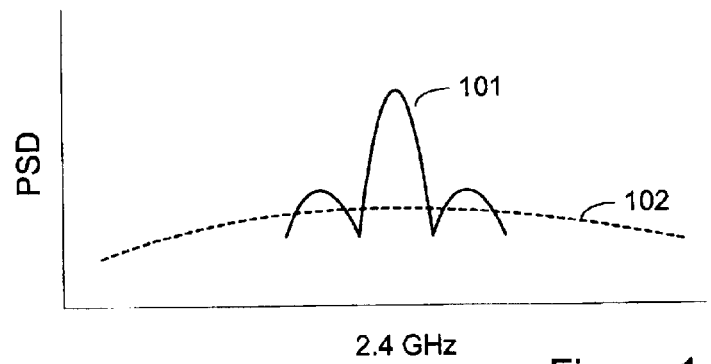
FIG. 1 illustrates the output spectrum a low-cost power amplifier.
Figure 2:
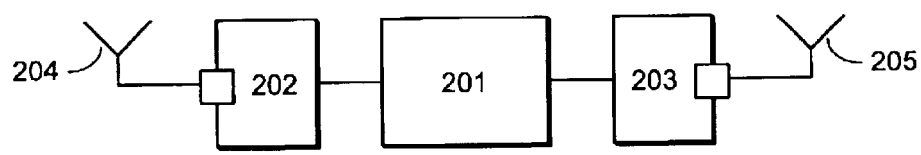
FIG. 2 is a block diagram of a componentized access point.
Figure 3:
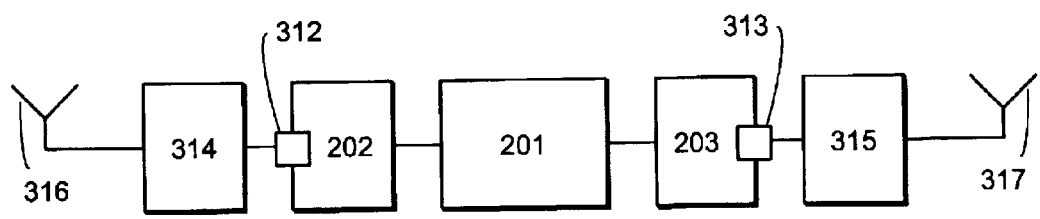
FIG. 3 is a block diagram of a componentized access point with a modular filter and antenna combination connected to the antenna connector of a radio component.

FIG. 3 is a block diagram of a componentized access point with a modular filter and antenna combination connected to the antenna connector of a radio component. The antenna connectors are identified as 312 and 313. In one physical embodiment, these are brass female plug receptors. Two filter and antenna combinations are depicted as 314 & 316 and as 315 & 317. Filter 314 is adapted to reject noise produced by radio 203. Filter 315 is adapted to reject noise produced by radio 202. In one embodiment, a filter 314 and an antenna 316 are integrated into a single component that is adapted to be coupled and decoupled at the antenna coupler 312. In this context, adapted to be coupled and decoupled refers to ease of assembly and interchangeability. Preferably, the components can be pressed or otherwise mated together by a user or assembly worker without using a tool. Alternatively, a user or worker may couple and decouple the component using a simple machine, such as a screw driver or chip puller. The antenna coupler 312 may function like a fish hook, being much easier to couple than to decouple. This is not meant to exclude a component that is pressed into place and then locked there by an adhesive or other fixing agent. However, it is not meant to include surface mounted components that are soldered in place using special, high volume equipment.

An example of an integrated filter and antenna component is 5.25 GHz antenna for 802.11a communications and a micro stripline or stripline filter on a single board. In another embodiment, the antenna protrudes from the chassis of the access point and the filter is 315 is adapted to be inserted into and removed from a socket that is coupled to the antenna connector 313 and to the antenna 317. In this example, the antenna protrudes from the chassis because it is designed for 2.4 GHz communications.

In antenna design, a designer combine antenna spacing and filtering to reduce the impact of first radio noise transmitted through a first antenna on a second radio connected to a second antenna. The compactness of access points for consumer use constrains a designer's ability to separate the first and second antenna.

The present invention includes recognizing that access points combine modular radios with changing design characteristics. Therefore, it is desirable to couple a filter between the radio and its antenna, connected at the antenna connector of a typical modular radio. This approach runs contrary to the prevailing trend to reduce the number of components in a system, including efforts to integrate filters into radios. This prevailing trend is described in European Patent Application No. EP 1 261 142 A1, entitled "Dual Mode Transceiver Architecture for Digital Wireless Communication", published 27 Nov. 2002, at paragraph [0038]. As the approach of this invention gains popularity, the antenna connector may evolve to look more like a filter socket. The filter is adapted to be changed without modifying the radio to which is attached. A change in radios used in assembly of access points can be accommodated by changing filters. An in-the-field substitution of radios can be accommodated by changing filters. Again, the filter may be independent of the antenna, so that it can be decoupled and replaced without changing antennas, or it may be integral with the antenna.

Figure 4:
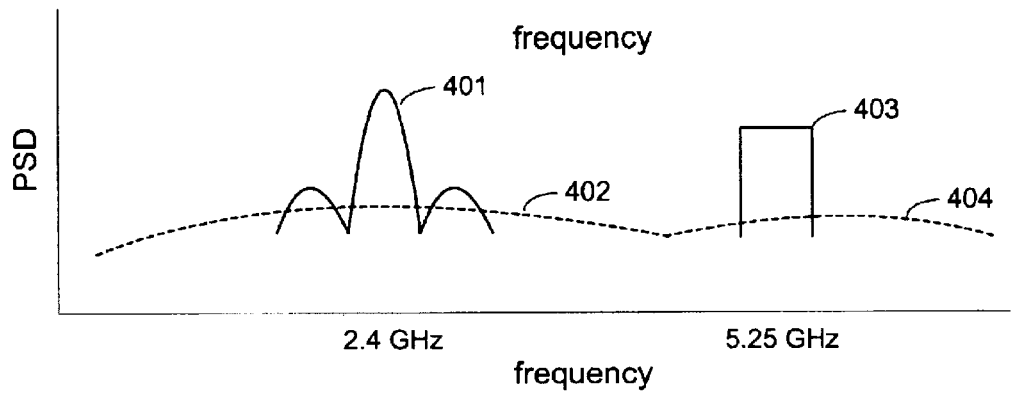
FIGS. 4 and 5 illustrate the effect of an off-radio filter on noise produced by a low-cost power amplifier.

FIG. 4 illustrates power amplifier noise of two radios in an access point. The two radios illustrated operate in different frequency spectrums of 2.4 and 5.25 GHz. The two radios operate out of band. Their desired signal characteristics are illustrated by curves 401, 403. Noise 402, 404 inevitably accompanies the desired signals 401, 403. This may be power amplifier noise or noise associated with other portions of the transmission chain. The combined noise curves of the two radios can be significant.

Figure 5:
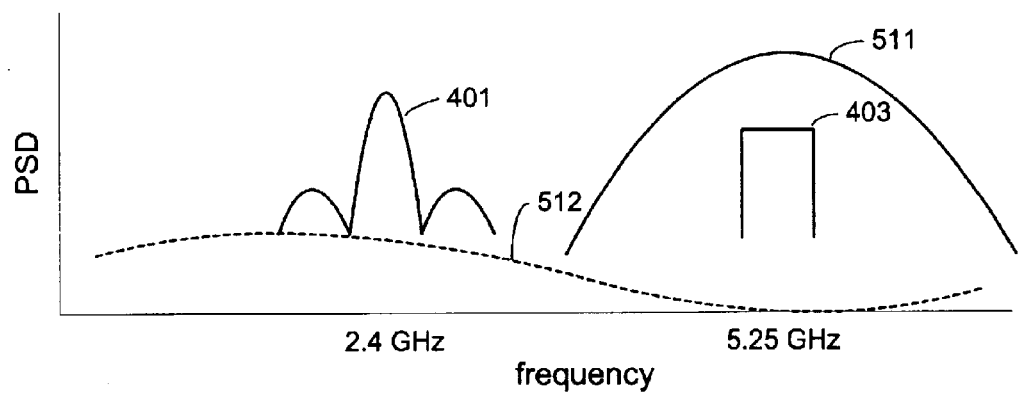

FIG. 5 illustrates the effect of a filter 511 on a combined noise curve. This figure is not meant to be to scale. The figure illustrates a bandpass filter, illustrated by an inverted parabolic curve. The filter 511 changes the noise curve 402 so that the 5.25 GHz receiver is impacted by noise 512 at a low level where the signal 403 is concentrated.

Figure 6:
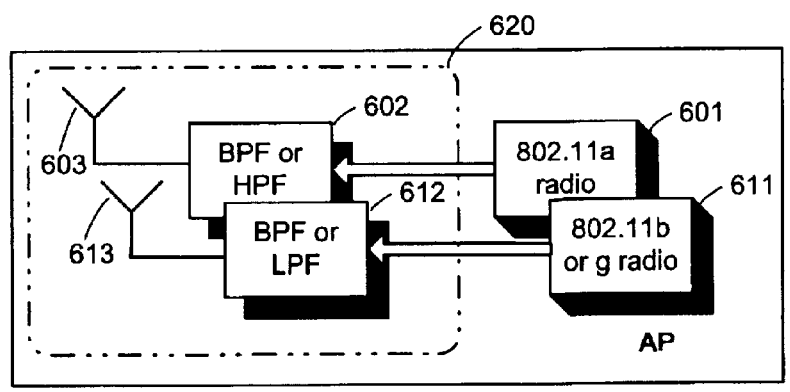
FIG. 6 is an alternative block diagram of radios operating in distinct frequency spectrums.

FIG. 6 is an alternative block diagram of dual radios and filter and antenna combinations. The dual radios 601, 611 operate in different frequency spectrums. For instance, one radio may implement 802.11a (601) and the other may implement 802.11b or g (611). Each radio is paired with a filter (602, 612) and an antenna (603, 613). The filters are select to complement the other radio, for instance, filter 602 is designed to compensate for radio 611.

Figure 7:
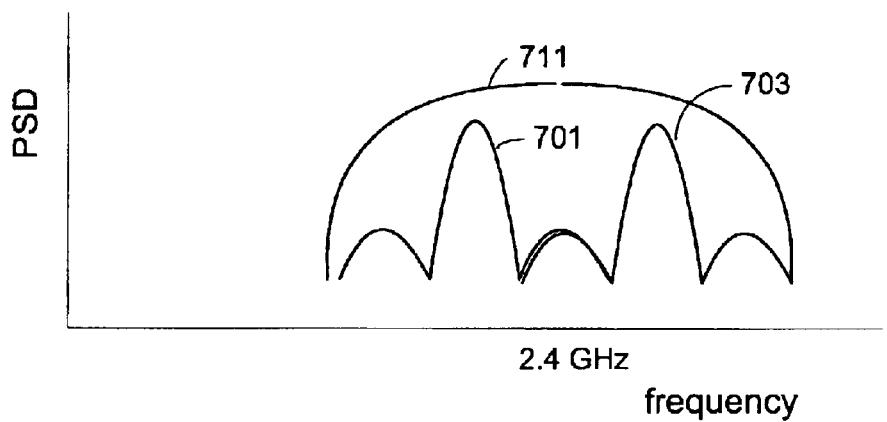
FIGS. 7 and 8 illustrate the effect of an off-radio filter on interference produced by adjacent channels operation in the same band.
Figure 8:
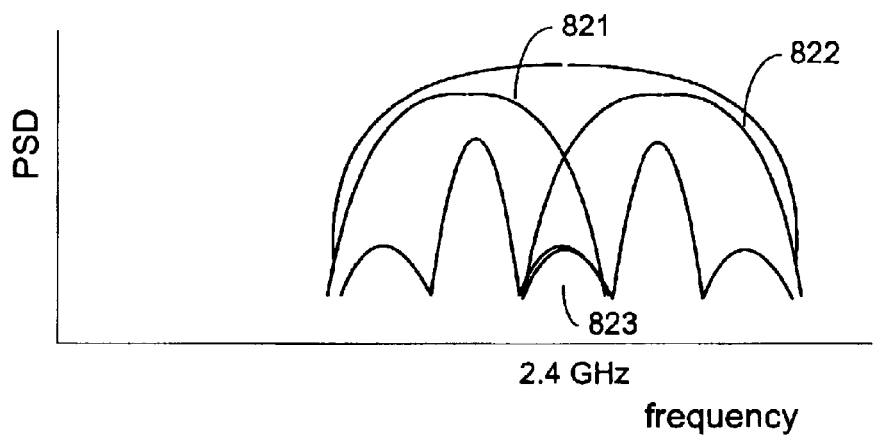

FIG. 7 illustrates power amplifier noise of two radios in an access point that operate in the same frequency spectrum, such as 2.4 GHz. The two radios operate in band. Two channels that do not overlap at their central lobes are illustrated 701 and 703. Radio modules will have a general bandpass filter 711 to select the relevant channels. To allow the two radios to work simultaneously, uncoordinated in the same band, additional filtering is applied. FIG. 8 illustrates the additional filtering. Filter transfer functions 821 and 822 overlap in region 823. The different filter transfer functions separate the central lobes of signals 701 and 703.

Figure 9:
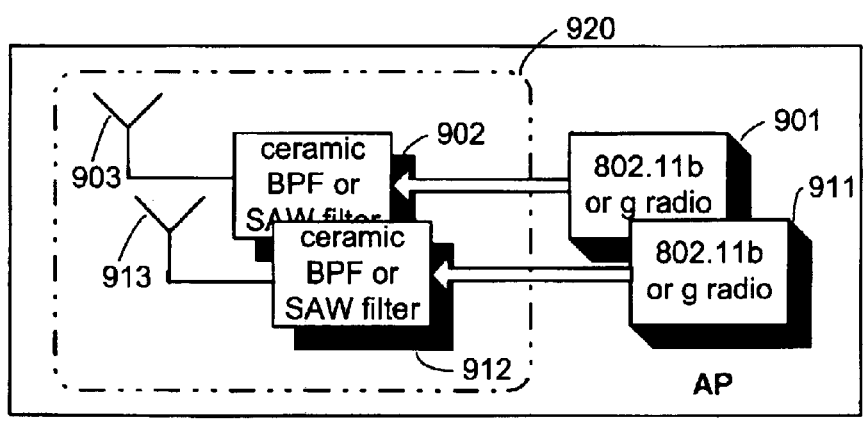
FIG. 9 is an alternative block diagram of radios operating in generally the same frequency spectrum.

FIG. 9 is an alternative block diagram of dual radios dual radios 901, 911 that operate in the same band. For instance, both radios may implement 802.11b or g. Each radio is paired with a filter (902, 912) and an antenna (903, 913). The filters are select to complement the other radio, for instance, filter 902 is designed to compensate for radio 911.

In addition to passive filters, the present invention may be practiced by componentizing a combination of an active component and one or more antennas. For instance, an output power amplifier may be combined with an antenna and connected at the antenna coupler of a radio. A low noise input power amplifier and antenna may be connected at the antenna coupler of the radio. A switching diode may be combined with the antenna, to switch the RF signal from one trace or copper line to another. A combination of a switching diode, PA and LPA also may work with an antenna and be attached at one or more antenna couplers. An RF phase shifter may be combined with a plurality of antennas, to shape the broadcast signal or reception sensitivity.

This invention includes several aspects. One aspect is an antenna and filter component for a multi-radio access point that includes at least a first radio, a second radio and a motherboard. The first and second radios may operate simultaneously. They may be adapted to be attached to and detached from the motherboard. The radios have antenna connectors. The antenna and filter combination includes a filter and antenna. A filter coupled to a first radio is adapted to suppress noise generated by the second radio. This noise may include side lobes of a signal, when the radios operate in the same general frequency spectrum. The filter and antenna may be integrated into a single component or the filter may be a separate devices adapted to be inserted and removed without replacing the antenna. The filter may be sharp, as necessary to exclude side lobes of an adjacent signal, or may be more gradual, when the radios operate in distinct frequency spectrums. The filter may be a diplexer. Or, it may be a stripline or micro stripline filter or a ceramic or SAW filter, as appropriate, depending on whether the radios are in the same or different bands.

Another embodiment of the present invention is a plurality of antenna and filter components for a multi-radio access point. The access point typically includes at least first and second radios that have antenna connectors. The antenna and filter components include a first filter adapted to suppress noise/interference generated by the second radio, the first filter coupled to a first antenna, wherein the first filter and antenna are removably attached to the antenna connector of the first radio. The antenna and filter components include a second filter adapted to suppress noise generated by the first radio, the second filter coupled to a second antenna, wherein the second filter and antenna are removably attached to the antenna connector of the second radio. Removably attached, in this context, includes being adapted to be coupled and decoupled, as explained above.

Devices of the present invention also may be recast as methods. One such is a method of modularizing components of a multi-radio access point, including demarking a separation between radios and antenna at an antenna connector; and providing a filter and antenna component, adapted to be coupled and decoupled at the antenna connector, wherein the filter of the filter and antenna component for a first radio of the multi-radio access point is adapted to reject noise from at least one other radio of the multi-radio access point. Aspects of this method may adopt features of the devices set forth above. The method also may be expressed as a method of providing first and second combinations of filters and antennas, consistent with that device embodiment.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will

I claim as follow:

1. An antenna and filter component for a multi-radio access point that includes at least a first radio, a second radio and a motherboard, wherein the first and second radios operate simultaneously, are adapted to be attached to and detached from the motherboard and have antenna connectors, including:

a filter adapted to suppress noise generated by the second radio, the filter coupled to an antenna, wherein the antenna and filter component is adapted to be attached to and detached from the antenna connector of the first radio.

2. The method of claim 1, wherein the filter and antenna component is integrated into a single component.

3. The method of claim 1, wherein the filter and the antenna are separate devices and the filter is adapted to be inserted and removed without replacing the antenna.

4. The method of claim 1, wherein the first and second radios operate in generally the same frequency spectrum and the filter is sharp.

5. The method of claim 1, wherein the radios use separate send and receive antennas and the filter is a diplexer.

6. The method of claim 1, wherein the radios operate in distinctly different frequency spectrums and the filter is a stripline or micro stripline filter.

7. The method of claim 1, wherein the first and second radios operate in generally the same frequency spectrum and the filter is a ceramic bandpass filter.

8. The method of claim 1, wherein the first and second radios operate in generally the same frequency spectrum and the filter is a SAW filter.

9. The method of claim 1, further including an active component combined with the antenna and filter, wherein the antenna, filter and active component combination is adapted to be attached to and detached from the antenna connector of the first radio.

10. An antenna and active component combination for a multi-radio access point that includes at least a first radio, a second radio and a motherboard, wherein the first and second radios operate simultaneously, are adapted to be attached to and detached from the motherboard and have antenna connectors, including:

an active component adapted to modify a signal processed by the antenna, the active component coupled to the antenna, wherein the antenna and active component combination is adapted to be attached to and detached from the antenna connector of the first radio.

11. The method of claim 10, wherein the active component is an output power amplifier.

12. The method of claim 10, wherein the active component is an input low noise amplifier.

13. The method of claim 10, wherein the active component is an RF phase shifter that is coupled to more than one antenna.

14. The method of claim 10, wherein the active component is a switching diode.

15. The method of claim 10, wherein the active component includes a switching diode, an output power amplifier and an input low noise amplifier.

16. A plurality of antenna and filter components for a multi-radio access point that includes at least first and second radios that have antenna connectors, including:

a first filter adapted to suppress noise generated by the second radio, the first filter coupled to a first antenna, wherein the first filter and antenna are removably attached to the antenna connector of the first radio; and a second filter adapted to suppress noise generated by the first radio, the second filter coupled to a second antenna, wherein the second filter and antenna are removably attached to the antenna connector of the second radio.

17. A method of modularizing components of a multi-radio access point, including:

demarking a separation between radios and antenna at an antenna connector; and providing a filter and antenna component, adapted to be coupled and decoupled at the antenna connector, wherein the filter of the filter and antenna component for a first radio of the multi-radio access point is adapted to reject noise from at least one other radio of the multi-radio access point.

* * * * *